United States Patent
Hentrich

Patent Number: 6,095,445
Date of Patent: Aug. 1, 2000

[54] CARTRIDGE BUCKLER FOR A TAPE DRIVE

[75] Inventor: Gregory P. Hentrich, Longmont, Colo.

[73] Assignee: Quantum Corporation, Milpitas, Calif.

[21] Appl. No.: 09/145,861

[22] Filed: Sep. 2, 1998

[51] Int. Cl.$^7$ .................................................... G03B 1/58
[52] U.S. Cl. .................. 242/332.4; 242/337; 242/338; 360/96.5; 360/99.03
[58] Field of Search ................ 242/332.4, 338, 242/339, 337; 360/93, 96.5, 99.02, 99.03

[56] References Cited

U.S. PATENT DOCUMENTS

| | | | |
|---|---|---|---|
| 3,934,840 | 1/1976 | Inaga | 242/332.4 |
| 4,259,701 | 3/1981 | Pera | 242/339 X |
| 4,572,460 | 2/1986 | Hertrich . | |
| 4,646,177 | 2/1987 | Sanford et al. | 242/332.4 X |
| 4,662,049 | 5/1987 | Hertrich . | |
| 4,679,747 | 7/1987 | Smith | 242/332.4 |
| 4,720,913 | 1/1988 | Hertrich . | |
| 4,793,569 | 12/1988 | Ohsaki | 242/332.4 |
| 5,518,195 | 5/1996 | Herima et al. | 242/339 |
| 5,769,346 | 6/1998 | Daly | 242/332.4 |
| 5,820,055 | 10/1998 | Leger et al. | 242/337 |

*Primary Examiner*—Donald P. Walsh
*Assistant Examiner*—Emmanuel M. Marcelo
*Attorney, Agent, or Firm*—Steven Roeder

[57] ABSTRACT

A tape drive includes a receiver adapted to receive a cartridge having a cartridge leader, a buckler which selectively retains a drive leader of the tape drive, and a buckler motor coupled to the buckler. The buckler motor selectively moves the buckler relative to the receiver to selectively couple and de-couple the drive leader to the cartridge leader. Importantly, this reduces the force necessary to insert the cartridge into the receiver. Further, with the use of buckler motor, the leaders are unbuckled before the cartridge is ejected. This allows for better control over the eject speed and eject distance of the cartridge.

27 Claims, 8 Drawing Sheets

CARTRIDGE BUCKLER FOR A TAPE DRIVE

FIELD OF THE INVENTION

The present invention relates generally to tape drives which utilize a cartridge containing a storage tape for storing data. More specifically, the present invention relates to a tape drive having an improved buckler for buckling and unbuckling a cartridge leader on the storage tape to a drive leader of the tape drive.

BACKGROUND

Tape drives are widely used for storing information in digital form. These tape drives commonly use a storage tape having a thin film of magnetic material which receives the information. Typically, the storage tape is moved between a pair of spaced apart reels, past a data transducer to record or read back information from the storage tape.

In one type of tape drive system, one of the reels is part of the tape drive while the other reel is part of a removable cartridge. For this type of tape drive system, the reel which is a part of the tape drive is commonly referred to as a take-up reel, while the reel which is a part of the cartridge is commonly referred to as a cartridge reel. In this type of tape drive system, upon insertion of the cartridge into the tape drive, it is necessary to couple the storage tape on the cartridge reel to the take-up reel of the tape drive. Subsequently, the storage tape must be uncoupled from the take-up reel, prior to removing the cartridge from the tape drive system.

Recently, tape drive systems have been developed which automatically couple a cartridge leader on the storage tape to a drive leader which is connected to the take-up reel during insertion of the cartridge into the tape drive. One such system utilizes the movement of the cartridge into and out of the tape drive to buckle and subsequently unbuckle the cartridge leader and the drive leader. More specifically, with this system, a buckler is rotated by the cartridge during insertion of the cartridge into the tape drive to couple the drive leader to the cartridge leader. Subsequently, during ejection of the cartridge, frictional force between the tape drive and the cartridge is utilized to assist in reliably unbuckling the cartridge leader from the drive leader.

Unfortunately, with this system a relatively large force may be required to insert the cartridge into the receiver. Further, because, a frictional force is assisting in the unbuckling of the leaders, the distance in which the cartridge is ejected, as well as the ejection speed of the cartridge, is very difficult to control. Accordingly, there is a need for an easy and accurate way to couple and de-couple the cartridge leader of the storage tape and the take-up reel of tape drive.

In light of the above, it is an object of the present invention to provide an improved tape drive which automatically couples and de-couples the storage tape to the take-up reel. Another object of the present invention is to provide a tape drive having better control of the eject distance and eject speed of the cartridge. Still another object of the present invention is to provide a tape drive system which reduces the force required to insert the cartridge into the tape drive. Yet another object of the present invention is to provide a tape drive system having a buckler which reliably couples and de-couples the storage tape to the take-up reel and which is relatively easy and cost efficient to manufacture and utilize.

SUMMARY

The present invention is directed to a tape drive which satisfies these objectives. The tape drive includes a receiver, a buckler which selectively retains a drive leader, and a buckler motor coupled to the buckler. The receiver is adapted to receive a cartridge having a cartridge leader. Importantly, with the present invention, the buckler motor selectively moves the buckler relative to the receiver to automatically couple and uncouple the drive leader and the cartridge leader. This reduces the force necessary to insert the cartridge into the receiver. Further, with the use of the buckler motor, the leaders are unbuckled before the cartridge is ejected. This allows for better control over the eject speed and eject distance.

The tape drive includes a load ring which is adapted to rotate relative to the receiver. The load ring is coupled to buckler and the buckler motor so that rotation of the buckler motor results in rotation of the load ring and the buckler relative to the receiver.

The tape drive also includes an interposer and an eject mechanism. The interposer is movable relative to the receiver between a locked position which retains the cartridge within the receiver and an unlocked position which allows the cartridge to be inserted into or ejected from the receiver. The load ring is preferably also coupled to the interposer and adapted to move the interposer from the locked position to the unlocked position. This feature allows the buckler motor to rotate the load ring and move the interposer to the unlocked position to begin ejection of the cartridge.

The eject mechanism is adapted for moving the cartridge within the receiver. More specifically, the eject mechanism is adapted to move the cartridge an eject distance in the receiver during ejection of the cartridge. Preferably, the eject mechanism is adapted to retain the interposer in the unlocked position when a cartridge is not positioned within the receiver. This feature eliminates the need for a solenoid latch for retaining the interposer in the unlocked position.

The present invention is also a method for buckling a drive leader of a tape drive to a cartridge leader of a cartridge. The method includes the steps of positioning the cartridge within a receiver of the tape drive and rotating a buckler with a buckler motor so that buckler couples the drive leader to the cartridge leader. The method also includes the step of rotating the buckler with the buckler motor so that buckler de-couples the drive leader from the cartridge leader.

Importantly, the tape drive utilizes a buckler motor to rotate the buckler to couple and de-couple the drive leader and the cartridge leader. This reduces the force necessary to insert the cartridge and allows for better control over the eject speed and eject distance.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
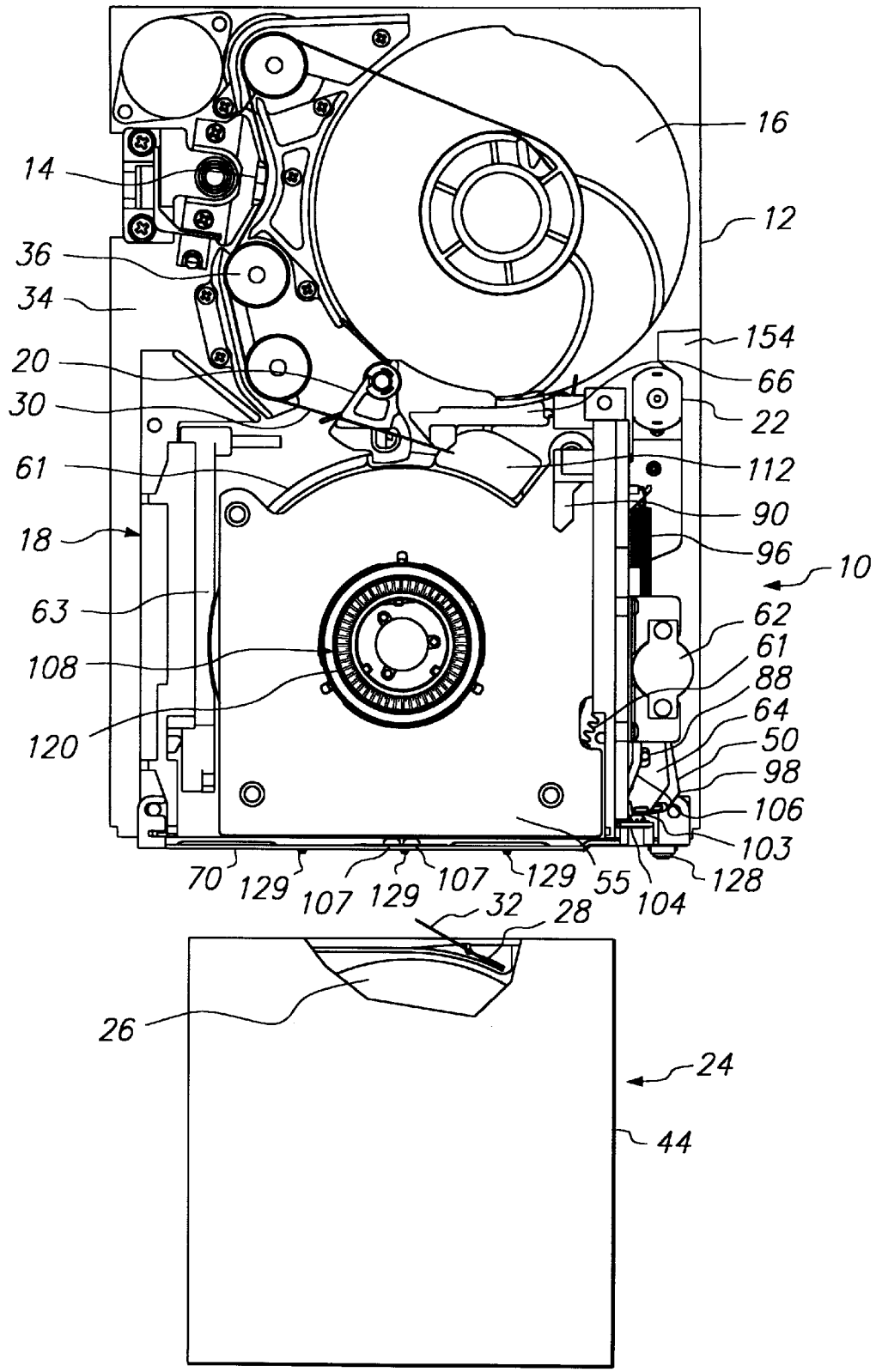
FIG. 1 is a top plan view of a portion of a tape drive and a cartridge in partial cut-away having features of the present invention.

Referring initially to FIG. 1, a tape drive 10 having features of the present invention includes a drive housing 12, a data transducer 14, a take-up reel 16, a receiver 18, a buckler 20, and a buckler motor 22. The tape drive 10 is used in conjunction with a cartridge 24 having a cartridge reel 26 which contains a storage tape 28. As provided in detail below, the buckler motor 22 selectively moves the buckler 20 relative to the receiver 18 to automatically couple and uncouple a drive leader 30 attached to the take-up reel 16 to a cartridge leader 32 attached to the storage tape 28. This reduces the force necessary to insert the cartridge 24 into the receiver 18. Further, because the buckler motor 22, uncouples the leaders 30, 32 before the cartridge 24 is ejected, there is better control over the eject speed and eject distance of the cartridge 24.

A detailed description of the various components of a tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of a tape drive 10 which are particularly significant to the present invention are provided herein. A representative tape drive 10 is sold by Quantum Corporation, the Assignee of the present invention under the trademark DLT™4000.

The drive housing 12 retains the various components of the tape drive 10. The drive housing 12, shown in FIG. 1, includes a base 34 which retains the various components of the tape drive 10. The drive housing 12 also includes side walls, a back, and a top which are not shown in FIG. 1 for clarity. The tape drive 10 includes a plurality of tape rollers 36 for guiding the storage tape 28 past the data transducer 14 and onto the take-up reel 16.

Figure 2:
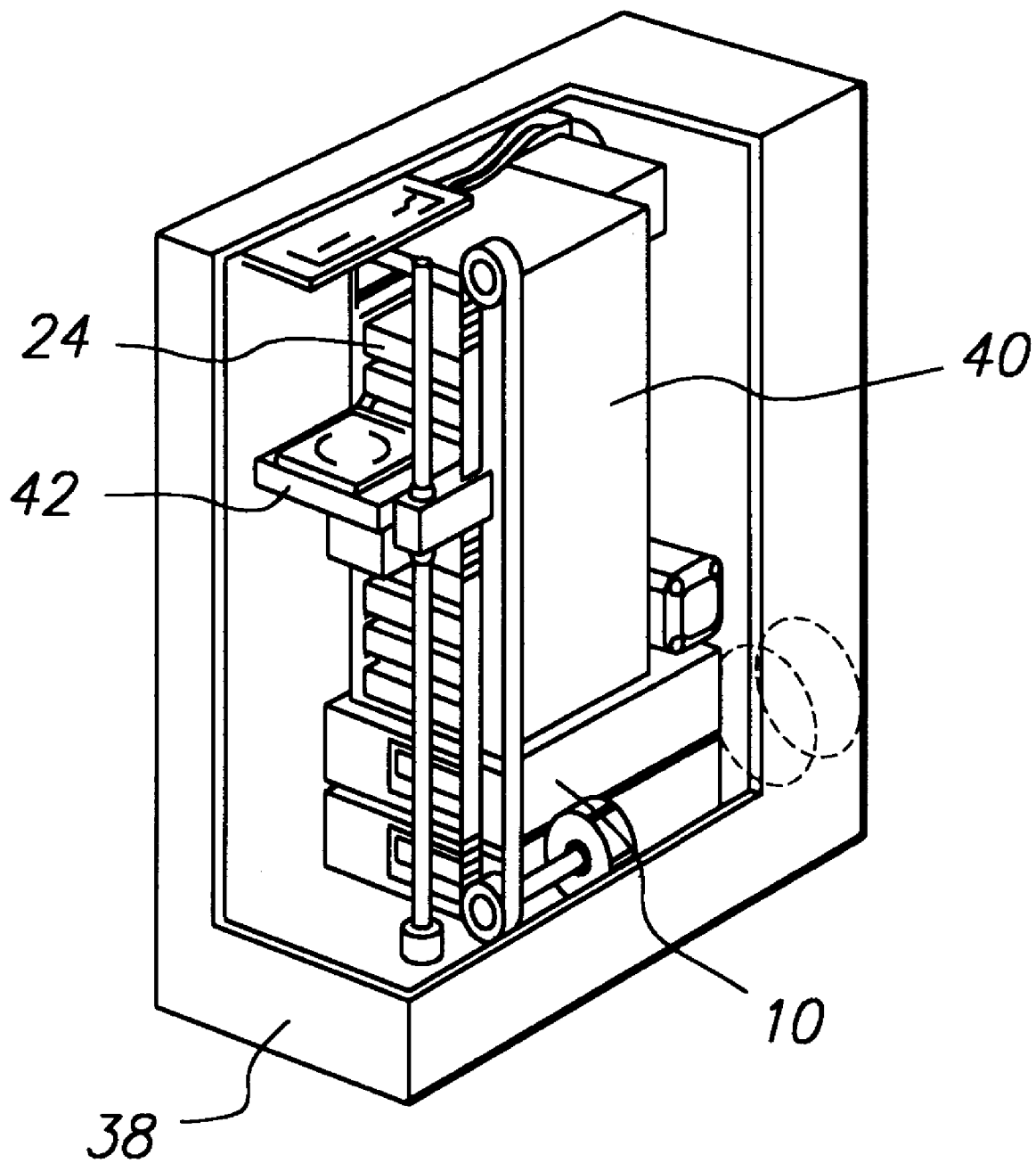
FIG. 2 is a perspective, partly cut-away view of a tape library including the tape drive of FIG. 1.

The tape drive 10 is typically installed within a computer (not shown), or a word processor (not shown). Alternately, the tape drive 10 can be utilized as part of a tape library 38. In the embodiment illustrated in FIG. 2, the tape library 38 includes a plurality of cartridges 24 which are retained in a multiple cartridge magazine 40, a robotic cartridge handler 42 and a pair of tape drives 10. The robotic cartridge handler 42 is used to selectively retrieve one of the cartridges 24 from the cartridge magazine 40 and place the cartridge 24 within one of the tape drives 10. A suitable tape library 38 is sold under the trademark DLTstor™, by Quantum Corporation.

The storage tape 28 stores data in a form that can be subsequently retrieved if necessary. A magnetic storage tape 28 is commonly used to store data in digital form. For conservation of space, the storage tape 28 has a tape width of preferably at least approximately one-half an inch (0.5 in) in width. Alternately, for example, the storage tape 28 can have a tape width of between approximately four millimeters to eight millimeters (4.0 mm–8.0 mm).

The storage tape 28 illustrated in the Figures includes a storage surface on one side of the storage tape 28 for storing data. The storage surface is divided into a plurality of tracks (not shown). Each track can be a linear pattern which extends the length of the storage tape 28. Alternately, for example, the data can be recorded in diagonal strips across the storage tape 28. As provided herein, the storage tape 28 can have between approximately one hundred and twenty-eight to two hundred and eight (128–208) tracks per tape 28. The storage tape 28 is initially retained on the cartridge reel 26 of the cartridge 24.

Figure 3:
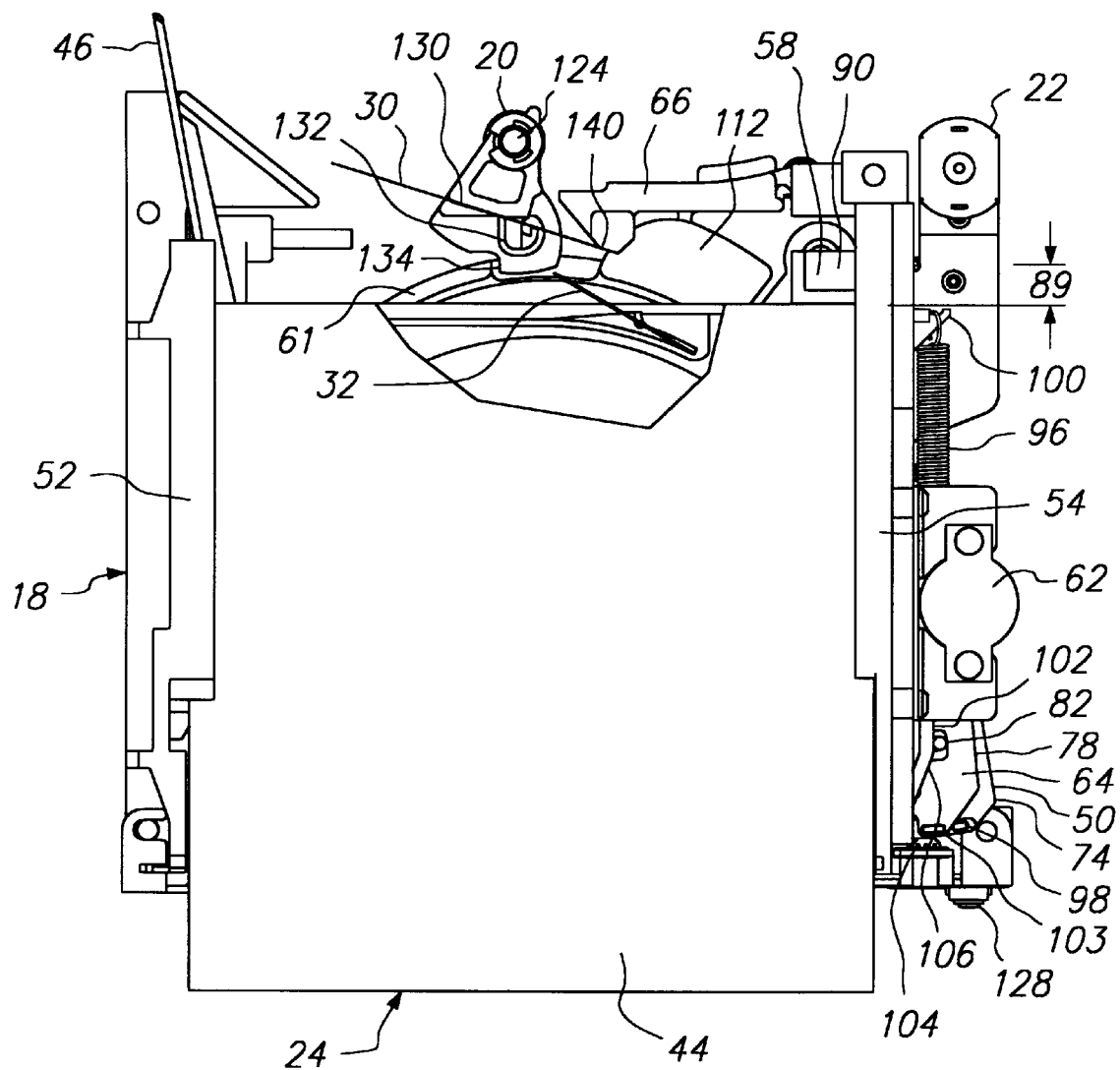
FIG. 3 is a top plan view of a portion of the tape drive and the cartridge.
Figure 4:
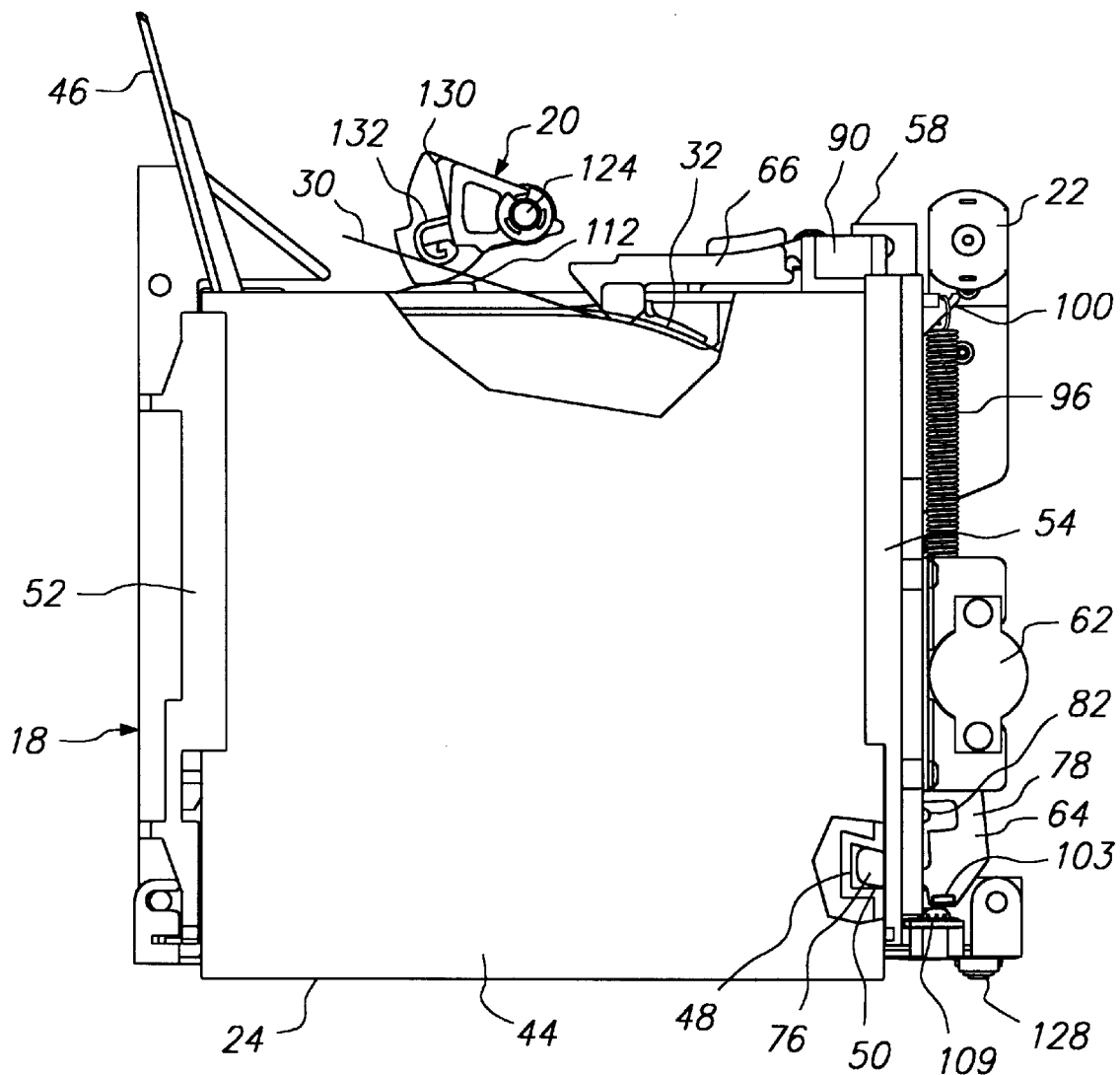
FIG. 4 is another top plan view of a portion of the tape drive and the cartridge.

Referring back to FIG. 1, the cartridge 24 includes a substantially rectangular cartridge housing 44 which encloses the cartridge reel 26 and the storage tape 28. Referring to FIGS. 3 and 4, the cartridge housing 44 includes a cartridge door 46 which can be pivoted between an open door position in which the cartridge leader 32 is exposed and a closed door position (not shown) in which the cartridge leader 32 is not exposed. The cartridge 24 also includes an interposer cartridge aperture 48 (shown in FIG. 4) which is adapted to receive a portion of an interposer 50 to selectively retain the cartridge 24 in the receiver 18. A suitable cartridge 24 is sold by Quantum Corporation under the Trademark DLTtape™ IV.

Figure 5:
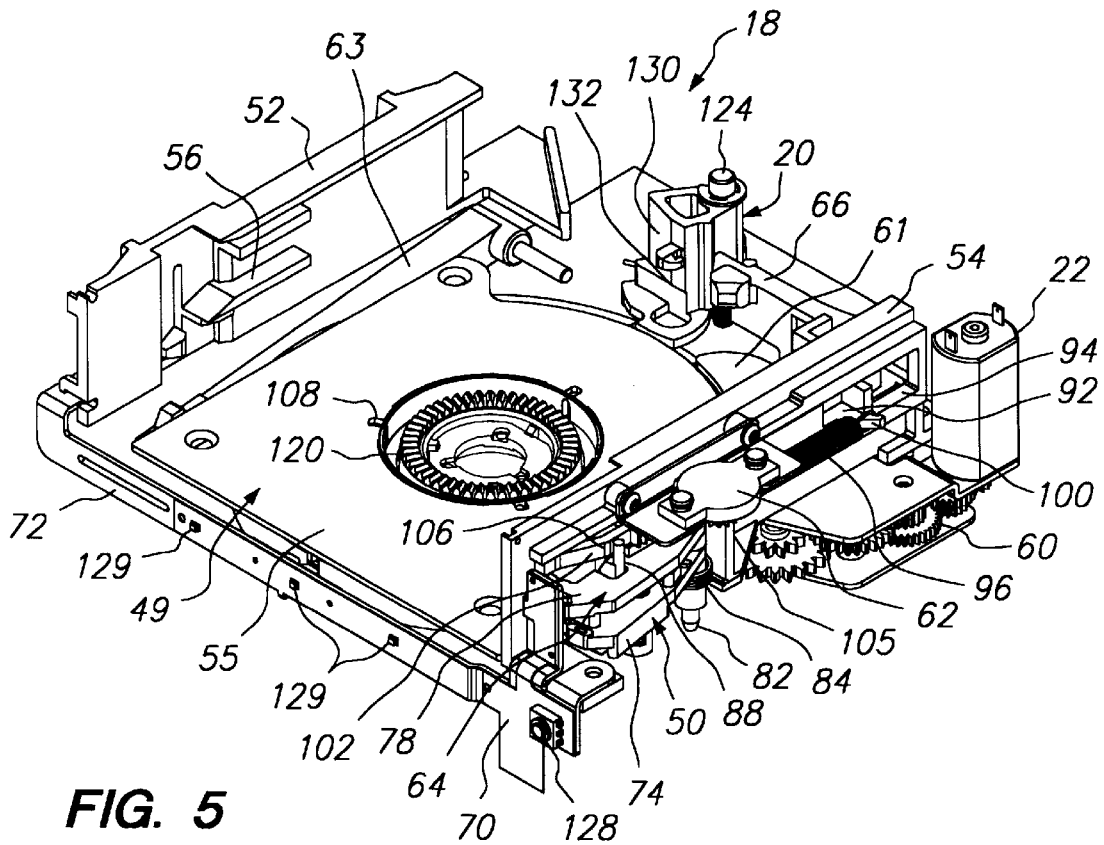
FIG. 5 is a perspective view of a portion of a receiver having features of the present invention.
Figure 6:
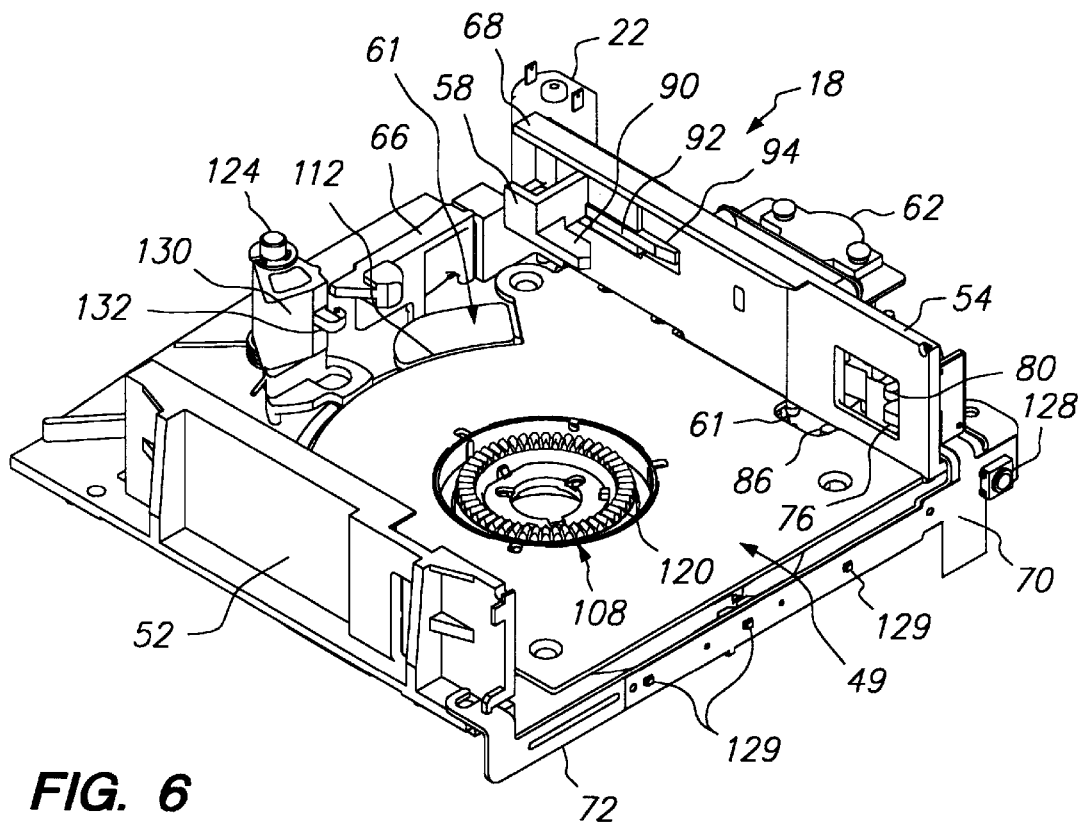
FIG. 6 is an alternate perspective view of the receiver of FIG. 4.

The receiver 18 includes a receiver slot 49 which is adapted to receive the cartridge 24. FIGS. 5 and 6 illustrate the receiver 18 from two alternate perspective views. The receiver 18 illustrated includes a left receiver side wall 52, a right receiver side wall 54, and a receiver bottom 55 which define the receiver slot 49. A protruding wall 56 extends away from the left receiver side wall 52 towards the right receiver side wall 54. The protruding wall 56 contacts the cartridge door 46 during movement of the cartridge 24 past the protruding wall 56 and causes the cartridge door 46 to move from the closed door position to the open door position.

The buckler motor 22, a gear train 60, the interposer 50, a damper 62, and a write protect lever 64 are positioned proximate to the right receiver side wall 54, while a load ring 61 and a clutch link 63 are positioned below the receiver bottom 55. An eject carriage mechanism 58 is attached to and slides relative to the right receiver side wall 54. The buckler 20 and a mushroom cam 66 are positioned near a receiver back 68 of the receiver 18 while a flex circuit 70 is secured to a receiver front 72 of the receiver 18. The load ring 61, the buckler 20, and a mushroom cam 66 each rotate relative to the receiver slot 49.

The design of the buckler motor 22 can be varied. For example, the buckler motor 22, illustrated in the Figures, is a small electric motor mounted to the drive housing 12. In order to precisely move the buckler 20, the buckler motor 22 is linked to the load ring 61 with the gear train 60 to gear down the rotation of the load ring 61 and the buckler 20. Basically, the gear train 60 includes a plurality of gears which reduce the rotation of the load ring 61 relative to rotation of the buckler motor 22. Thus, a relatively large amount of rotation of the buckler motor 22 is reduced with the gear train 60 into a relatively small amount of rotation of the load ring 61. In the embodiment illustrated in the Figures, the gear train 60 has a gear ratio of approximately 1430:1. This ratio allows for the very precise rotation of the load ring 61 and the buckler 20 relative to the receiver 18.

The interposer 50 is movable relative to the receiver 18 between a locked position which retains the cartridge 24 within the receiver 18 and an unlocked position which allows for the cartridge 24 to be ejected from the receiver 18.

The interposer 50 includes interposer body 74 which pivots near the receiver right side wall 54 outside of the receiver slot 49, and an interposer projection 76 which projects into the receiver slot 49 and interposer cartridge aperture 48 of the cartridge 24 to retain the cartridge 24 in the locked position. Somewhat similarly, the write protect lever 64 includes a lever body 78 which pivots on the outside of the receiver slot 49 above the interposer 50. The write protect lever 64 includes a lever projection 80 which extends into the receiver slot 49 in the cartridge 24 to engage the write protect switch (not shown) of the cartridge 24.

The interposer 50 and the write protect lever 64 pivot upon and are secured to the drive housing 12 with an interposer shaft 82. Further, an interposer spring 84 is utilized to bias the interposer 50 and the write protect lever 64 to the locked position. The interposer 50 also includes an interposer lever cam 86 (see FIG. 6) which projects through the right receiver side wall 54 below the receiver bottom 50. The interposer lever 86 interacts with the load ring 61 so that rotation of the load ring 61 results in movement of the interposer 50 from the locked position to the unlocked position. An interposer pin 88 extends upwardly from the interposer body 74 between the right receiver side wall 54 and the lever body 78. As provided below, the interposer pin 88 interacts with the eject mechanism 58 to hold the interposer 50 in the unlocked position. Further, the interposer pin 88 also moves the write protect lever 64 to the unlocked position.

The eject mechanism 58 moves the cartridge 24 within a portion of the receiver slot 49. More specifically, the eject mechanism 58 moves the cartridge 24 an eject distance 89 from the inserted position illustrated in FIG. 4 to the eject position illustrated in FIG. 3. The eject mechanism 58 includes a front finger 90 (shown in FIG. 6) which projects into the receiver slot 49 and interacts with the cartridge 24, and an eject body 92 which slides in a eject slot 94 in the right receiver side wall 54. An eject spring 96 extends between a receiver hook (not shown) attached to the right receiver side wall 54 and an eject hook 100 attached to the eject body 92 to pull the eject mechanism 58 toward the receiver front 72. An outer edge 102 of the eject body 92 includes a plurality of eject teeth (not shown) for interacting with a corresponding gear 105 on the eject damper 62. Thus, the eject speed and the eject distance can be controlled by controlling the eject spring 96 and the eject damper 62.

The eject mechanism 58 also includes a tapered distal end 106 which interacts with the interposer pin 88 which extends away from the interposer 50 to hold the interposer 50 in the unlocked position when the cartridge 24 is in the receiver 18. Stated another way, the eject mechanism 58 is coupled to the interposer 50 and retains the interposer 50 in the unlocked position when a cartridge 24 is not positioned within the receiver 18. Thus, a separate motor (not shown) is not required to retain the interposer 50 in the unlocked position.

Figure 7:
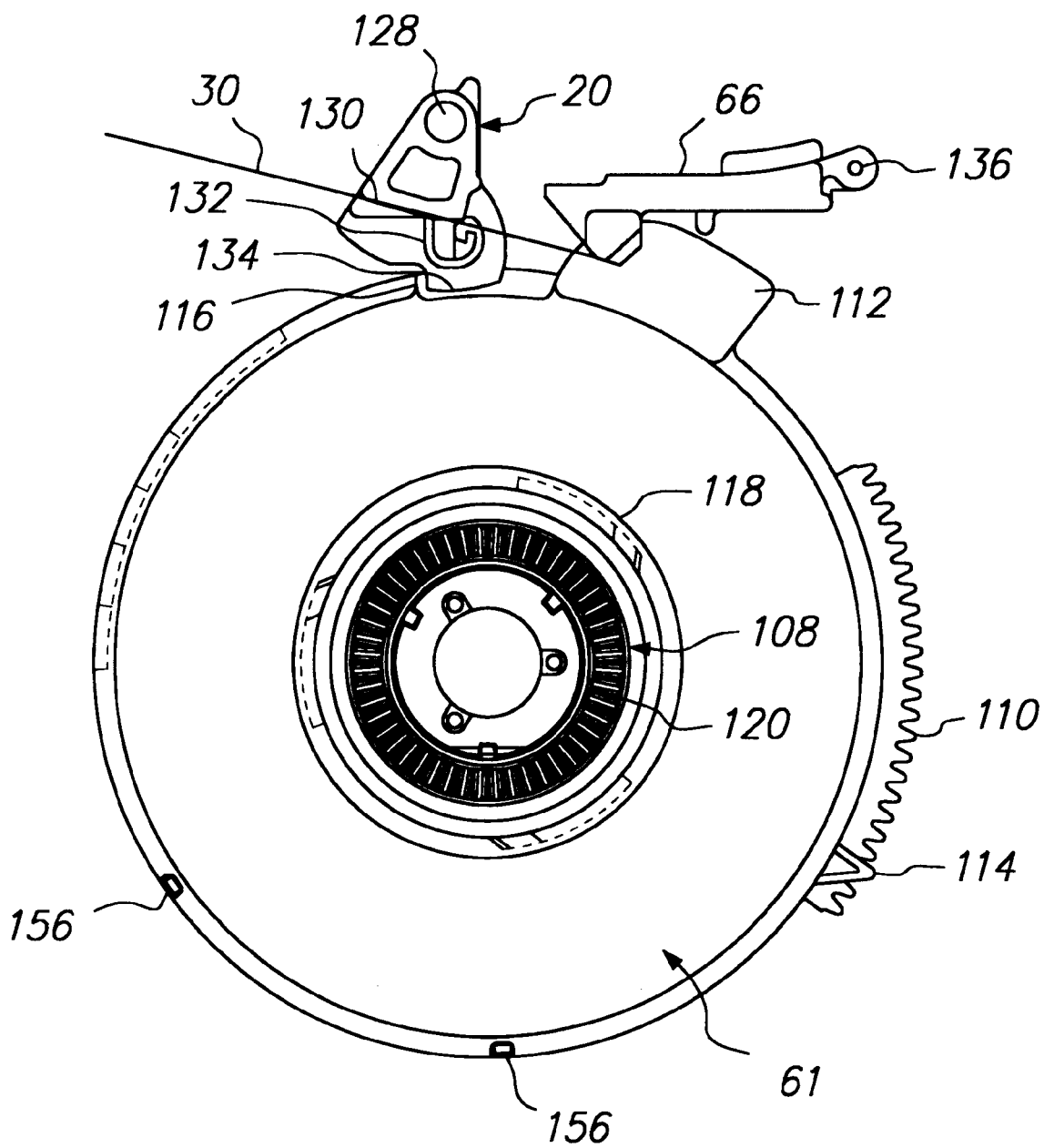
FIG. 7 is an illustration of a load ring and buckler.
Figure 8:
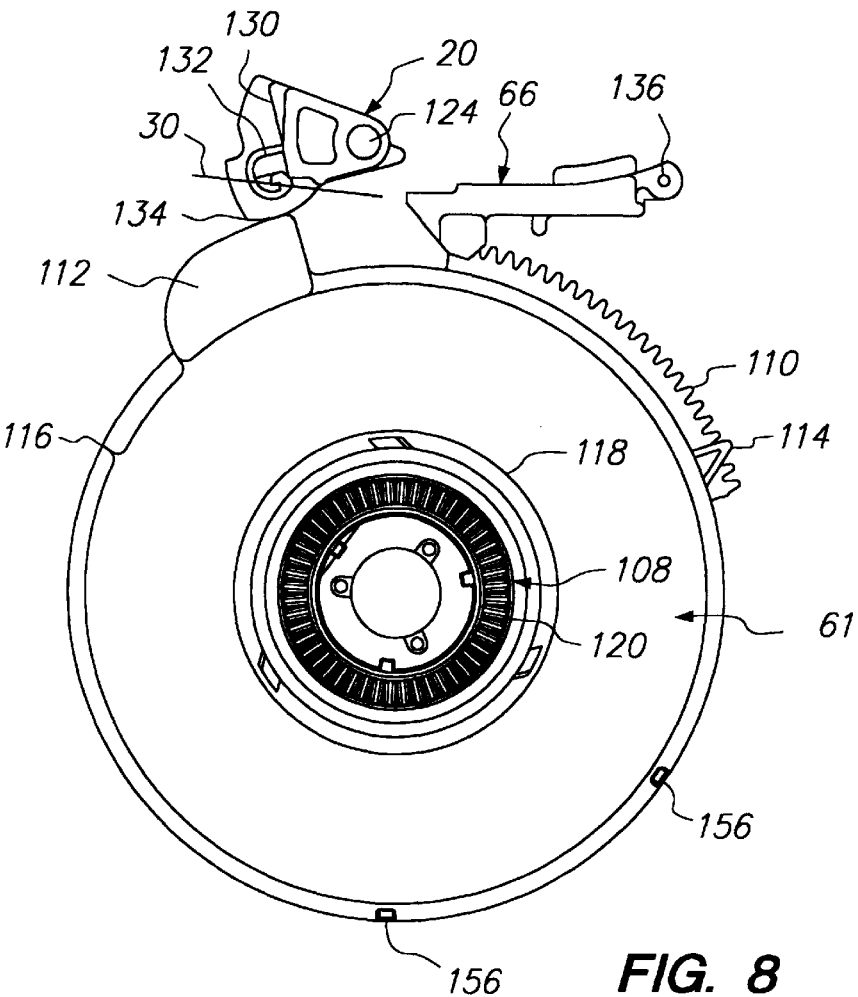
FIG. 8 is another illustration of the load ring and buckler.

FIGS. 7 and 8, illustrate the load ring 61, the buckler 20, the mushroom cam 66, and a reel driver 108 without the rest of the tape drive 10. The load ring 61 is coupled to the buckler 20 and the buckler motor 22, so that rotation of the buckler motor 22 results in rotation of the load ring 61 and the buckler 20 relative to the receiver 18. In the embodiment illustrated in FIGS. 7 and 8, the load ring 61 is disk shaped and includes a plurality of load ring teeth 110, a buckler cam 112, and an interposer cam 114 which are positioned around and extend away a circumference of the load ring 61. The load ring teeth 110 mesh with the teeth of the gear train 60 so that rotation of the gear train 60 results in rotation of the load ring 61.

As illustrated in FIG. 7, the buckler 20 is initially retained in a locked position by a lock notch 116 on the load ring 61. Referring to FIG. 8, rotation of the load ring 61 in the counter-clockwise direction results in interference between the buckler cam 112 and the buckler 20 which causes rotation of the buckler 20.

The load ring 61 is also coupled to the interposer 50 and is adapted to move the interposer 50 from the locked position to the unlocked position. Rotation of the load ring 61 in the clockwise direction results in interference between the interposer cam 114 (shown in FIGS. 7 and 8) and the interposer lever 86 (shown in FIG. 6) of interposer 50. Thus, rotation of the load ring 61 in the clockwise direction results in the interposer cam 114 moving the interposer 50 to the open position. This allows the rotation of the load ring 61 to initiate the ejection of the cartridge 24.

The load ring 61 is also coupled to and engages the reel driver 108 which is adapted to rotate the cartridge reel 26 in the cartridge 24. The reel driver 108 extends upwardly from the receiver bottom 55 of the receiver 18 in the center of the load ring 61. A center hub 118 of the load ring 61 is ramped so that rotation of the load ring 61 in the counterclockwise direction results in movement of the reel driver 108 upwardly, so that driver teeth 120 engage corresponding teeth in the cartridge 24. Somewhat similarly, rotation of the load ring 61 in the clockwise direction results in movement of the reel driver 108 downwardly, so that the driver teeth 120 disengage corresponding teeth in the cartridge 24.

Additionally, an edge of the load ring 61 includes a ramp (not shown) which contacts the clutch link 63 and allows for rotation of the load ring 61 to cause rotation of the clutch link 63 (shown in FIG. 5) upwardly into the cartridge 24 to release the cartridge reel 26. Thus, the rotation load ring 61 also results in movement of the clutch link 63 to release the cartridge reel 26.

The buckler 20 rotates relative to the receiver 18 on a buckler pin 124 between a coupled position and an uncoupled position. A buckler spring 126 biases the buckler 20 to return to the uncoupled position. The buckler 20 is wedge shaped and includes a front surface, a buckler hook 132 which projects away from the front surface 130, and a cam surface 134 which engages the buckler cam 112 of the load ring 61. The buckler hook 132 is positioned within a buckler aperture 152 in the drive leader 30 to selectively retain the drive leader 30.

The mushroom cam 66 pivots relative to the base on a cam pin 136. The mushroom cam 66 includes the mushroom shaped protrusion for deflecting a portion of the drive leader 30 within the cartridge leader 32.

Figure 9A:
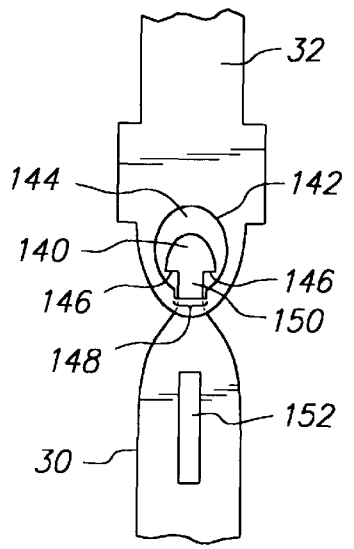
FIGS. 9a–c illustrate the engagement between the cartridge leader and a drive leader.
Figure 9B:
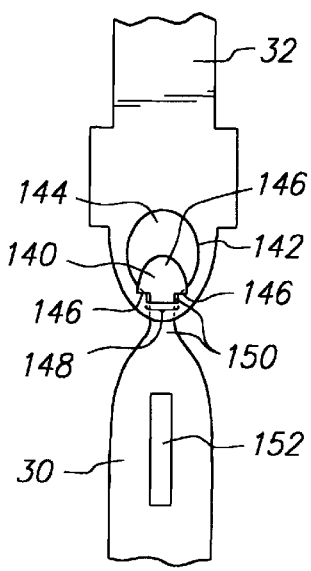
Figure 9C:
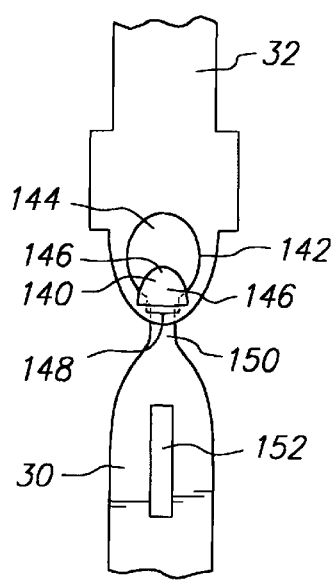
Figure 10:
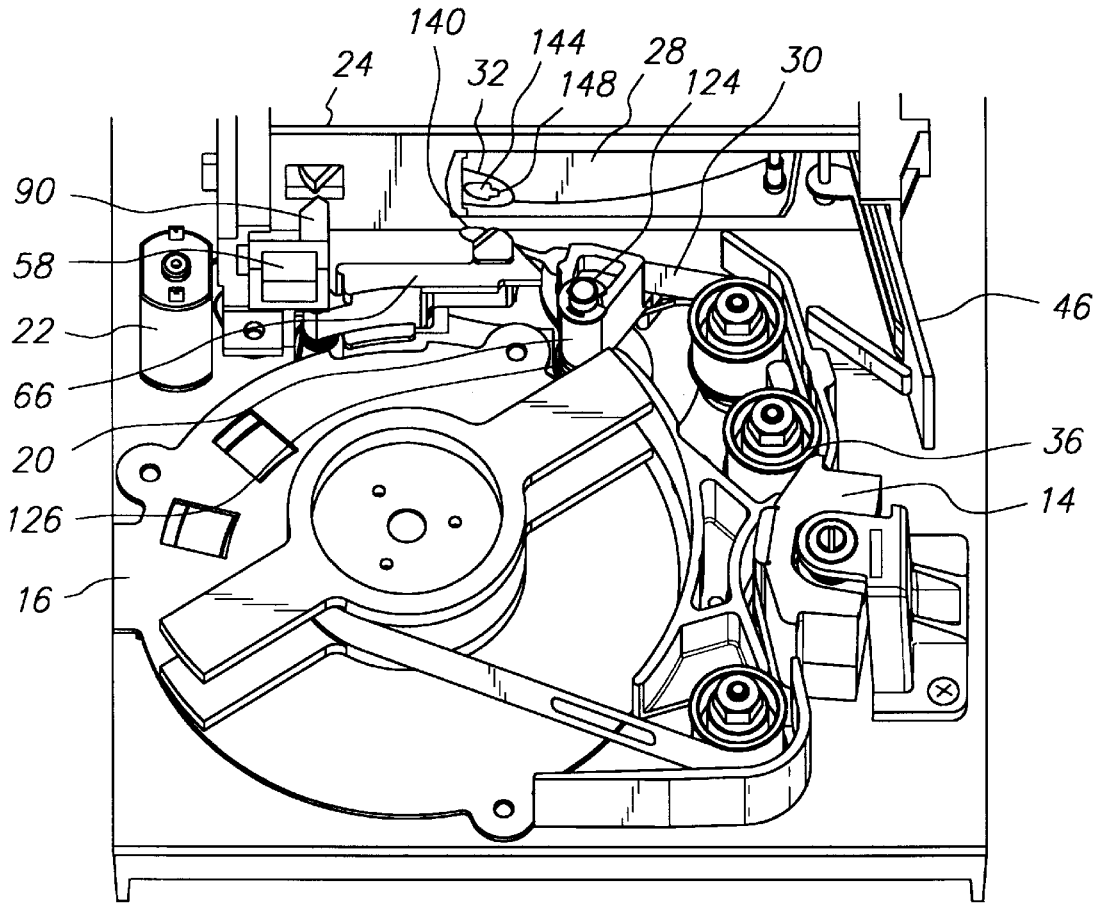
FIG. 10 is a rear perspective view of the buckler and cartridge.
Figure 11:
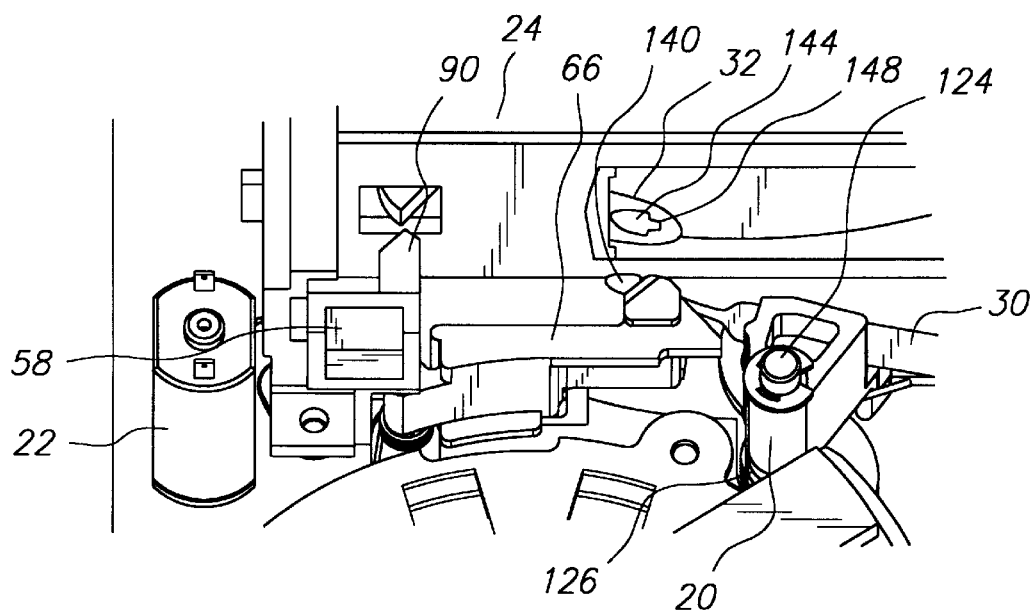
FIG. 11 is an enlarged view of the buckler and cartridge.

FIGS. 9a–c illustrate a tab 140 of the drive leader 30 being inserted and subsequently connected to a cartridge leader aperture 142 of the cartridge leader 32. The cartridge leader aperture 142 includes a rounded portion 144 which is wide enough to receive a head 146 of the tab 140 and a slot 148 which is wide enough to receive a stem 150 of the tab 140 but block the head 146 when the leader 32 is pulled. The drive leader 30 also includes the buckler aperture 152 which is selectively retained by the buckler hook 132. After coupling of the leaders 30, 32, rotation of the take-up reel 16 results in movement of the storage tape 28 from the cartridge reel 26 past the data transducer 14.

The tape drive 10 further includes a controller 154 which is adapted to activate the buckler motor 22 after the cartridge 24 has been inserted into the receiver 18. The controller 154 includes the circuitry which controls and monitors the status the tape drive 10 and can be implemented in a number of alternate ways. The controller 154 is represented as a block in FIG. 1 for illustration purposes only. Those skilled in the art will recognize that the design and location of the controller 154 can be varied. The controller 154 can be electrically connected to the motor 22, the flex circuit 70 and the other electrical devices and switches of the tape drive 10.

In the embodiment provided herein, an interposer magnet 98 is attached to the interposer 50. The interposer magnet interacts with an interposer hall effect switch (not shown) to inform the controller 154 when the interposer 50 is in the locked or unlocked position. With this information, the controller 154 can determine if a cartridge 24 is positioned within the receiver 18. Similarly, the write protect lever 64 includes a lever magnet 103 for interacting with a lever hall effect switch 104 for informing the controller 154 when the write protect lever 64 is in the locked or unlocked position. Additionally, the load ring 61 includes spaced apart load magnets 156 which interact with a pair of ring hall effect switches 107 (FIG. 1) to inform the controller 154 of the position of the load ring 61. With the position of the load ring 61, the controller 154 can also determine the position of a number of other components, including the buckler 20 and the ring teeth 110. Importantly, the information regarding the position of the interposer 50, the write protect lever 64, whether a cartridge 24 is in the receiver 18, and additional information can be transferred from the controller to the flex circuit 70 for display to the user.

The flex circuit 70 spans the receiver front 72. The flex circuit 70 can include drive status sensors, sense load/unload status lights, write protect status lights, cartridge present status lights, and an eject button 128. The status lights can be LEDs 129 which are attached to the flex circuit 70. Because the flex circuit 70 is secured to the receiver front 72 of the tape drive 10, a bezel (not shown) can be secured to the tape drive 10 after assembly of the tape drive 10. Thus, the bezel can be attached before the drive 10 is shipped to the customer and color of bezel can be added easily after the manufacturing has been completed.

Operation of the present buckler 20 can probably best be understood with reference to FIGS. 3, 4, 9a–c, 10, and 11. Initially, the cartridge 24 is inserted into the cartridge slot 49. Insertion of the cartridge 24 causes the cartridge door 46 to rotate to the open position. Once the cartridge 24 is inserted, the mushroom cam 66 forces the tab 140 into the cartridge leader aperture 142. This movement of the cartridge 24 within the receiver 18 causes the eject mechanism 58 to move towards the receiver back 68. This causes the tapered distel end 106 of the eject mechanism 58 to move away from the interposer pin 88 and allows the interposer 50 and the write protect lever 64 to move from the unlocked position to the locked position. Subsequently, interaction between the interposer magnet and the interposer hall effect switch notifies the controller 154 that the interposer 50 is in the locked position.

Next, with the interposer 50 in the locked position, the controller 154 causes the buckler motor 22 to rotate the gear train 60 and the load ring 61 in the counterclockwise direction. Rotation of the load ring 61 in the counterclockwise direction causes the buckler cam 112 on the load ring 61 to engage the cam surface 134 of the buckler 20. This causes rotation of the buckler 20 and engagement of the drive leader 30 to the cartridge leader 32. Additional rotation of the buckler 20 allows the buckler hook 132 to rotate out of the buckler aperture 152. Further rotation of the load ring 61 results in the engagement of the reel driver 108 to the cartridge 24 and the rotation of the clutch link 63 to engage the cartridge 24.

Importantly, if no cartridge 24 is inserted into the cartridge slot 49, rotation of the buckler 20 will not release the drive leader 30 from the buckler hook 132. This results from the fact that rotation of the buckle 20 is independent of movement of the tape 28. Stated another way, the drive leader 30 must be coupled to the cartridge leader 32 before the buckler hook 132 can rotate out of the buckler aperture 152.

Subsequently, during the eject cycle, the controller 154 is instructed to begin the eject process. This can be accomplished, for example, by depressing the eject button 128. The controller 154 begins the eject process by the rotating the load ring 61 in the clockwise direction with the buckler motor 22. This allows the buckler hook 132 to engage the buckler aperture 152 in the drive leader 30 and unhook the drive leader 30 from the cartridge leader 32. Further rotation of the load ring 61 causes the load ring 61 to disengage the reel driver 108 from the cartridge 24 and the clutch link 63 from the cartridge 24. Additionally, rotation of the load ring 61 causes the interposer cam 114 to engage the interposer projection 76 to move the interposer 50 and the write protect lever 64 to the unlocked position. This allows the eject mechanism 58 to move towards the receiver front 72 and push the cartridge 24 the eject distance 89. Importantly, the leaders 30, 32 are uncoupled prior to load ring 61 engaging the interposer 50. Thus, the eject spring 96 and eject damper 62 control the eject distance 89. Further, the tapered distal end 106 of the eject mechanism 58 holds the interposer 50 and the write protect lever 64 in the unlocked position.

Importantly, with the present invention, the buckler motor 22 selectively moves the buckler 20 relative to the receiver 18 to automatically couple and uncouple the drive leader 30 to the cartridge leader 32. This reduces the force necessary to insert the cartridge 24 into the receiver 18. Further, with the use of buckler motor 22, the leaders 30, 32 are unbuckled before the cartridge 24 is ejected. This allows for better control over the eject speed and eject distance.

While the particular tape drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tape drive for use with a cartridge, the cartridge including a storage tape having a cartridge leader, the tape drive comprising:

a receiver which receives the cartridge;

a drive leader;

a buckler which selectively retains the drive leader; and a buckler motor coupled to the buckler, the buckler motor moving the buckler and the drive leader relative to the receiver so that the buckler couples the drive leader to the cartridge leader.

2. The tape drive of claim 1 wherein the buckler motor moves the buckler and the drive leader relative to the receiver so that the buckler de-couples the drive leader from the cartridge leader.

3. The tape drive of claim 1 further comprising a load ring which rotates relative to the receiver, the load ring being coupled to the buckler and the buckler motor so that rotation of the buckler motor results in rotation of the load ring and the buckler relative to the receiver.

4. The tape drive of claim 3 including a reel driver which moves between an engaged position in which the reel driver engages a cartridge reel of the cartridge and a disengaged position in which the reel driver does not engage the cartridge reel; wherein the load ring is coupled to the reel driver so that rotation of the load ring results in movement of the reel driver between the engaged position and the disengaged position.

5. The tape drive of claim 1 further comprising an interposer which moves relative to the receiver between a locked position in which the interposer engages a cartridge housing of the cartridge and retains the cartridge within the receiver and an unlocked position which allows the cartridge to be ejected from the receiver; wherein the buckler motor is coupled to the interposer and moves the interposer from the locked position to the unlocked position.

6. The tape drive of claim 5 further comprising an eject mechanism which moves the cartridge within a portion of the receiver, the eject mechanism retaining the interposer in the unlocked position when a cartridge is not positioned within the receiver.

7. The tape drive of claim 1 further comprising a controller which activates the buckler motor after the cartridge has been inserted into the receiver housing.

8. The tape drive of claim 1 further comprising (i) a drive housing, and (ii) a flex circuit attached to a front of the drive housing, the flex circuit including a drive status sensor.

9. A tape library including (i) a plurality of cartridges, (ii) a cartridge magazine retaining the cartridges, (iii) the tape drive of claim 1, the tape drive including a drive housing, and (iv) a cartridge handler which moves one of the cartridges from the cartridge magazine to the tape drive.

10. The tape drive of claim 1 wherein the drive leader includes a tab which inserts into a cartridge leader aperture of the cartridge leader to couple the drive leader to the cartridge leader, the tab including a stem and a head which cantilevers away from the stem, the head being wider than the stem.

11. The tape drive of claim 1 including a gear train coupled to the buckler and the buckler motor, the gear train reducing the rotation of the buckler relative to rotation of the buckler motor.

12. The tape drive of claim 1 wherein the buckler includes a buckler hook for selectively retaining the drive leader.

13. A tape drive which uses a cartridge, the cartridge including a storage tape having a cartridge leader, the tape drive comprising:
 a receiver which receives the cartridge;
 a take-up reel;
 a drive leader connected to the take-up reel;
 a buckler which selectively retains the drive leader;
 a buckler motor coupled to the buckler, the buckler motor rotating the buckler and moving the drive leader relative to the receiver so that the buckler selectively couples the drive leader to the cartridge leader and selectively de-couples the drive leader from the cartridge leader; and
 a controller which activates the buckler motor after the cartridge has been inserted into the receiver.

14. The tape drive of claim 13 further comprising (i) a reel driver which moves between an engaged position in which the reel driver engages the cartridge reel of the cartridge and a disengaged position in which the reel driver does not engage the cartridge reel, (ii) a reel motor which rotates the reel driver, and (iii) a load ring which rotates relative to the receiver, the load ring being coupled to the buckler and the buckler motor so that rotation of the buckler motor results in rotation of the load ring and the buckler relative to the receiver; the load ring being coupled to the reel driver so that rotation of the load ring results in movement of the reel driver between the engaged position and the disengaged position.

15. The tape drive of claim 13 further comprising an interposer which moves relative to the receiver between a locked position in which the interposer engages a cartridge housing of the cartridge and retains the cartridge within the receiver and an unlocked position which allows the cartridge to be ejected from the receiver; wherein the buckler motor is coupled to the interposer and moves the interposer from the locked position to the unlocked position.

16. The tape drive of claim 15 further comprising an eject mechanism which moves the cartridge within a portion of the receiver, the eject mechanism retaining the interposer in the unlocked position when a cartridge is not positioned within the receiver.

17. The tape drive of claim 13 further comprising (i) a drive housing, and (ii) a flex circuit attached to a front of the drive housing, the flex circuit including a drive status sensor.

18. A tape library including (i) a plurality of cartridges, (ii) a cartridge magazine retaining the cartridges, (iii) the tape drive of claim 13, the tape drive including a drive housing, and (iv) a cartridge handler which moves one of the cartridges from the cartridge magazine to the tape drive.

19. A method for buckling a drive leader of a tape drive to a cartridge leader of a cartridge, the method comprising the steps of:
 providing a tape drive including a receiver which receives the cartridge, a buckler which selectively retains the drive leader and a buckler motor which is coupled to and rotates the buckler;
 positioning the cartridge within the receiver of the tape drive; and
 rotating buckler with the buckler motor so that buckler moves the drive leader relative to the receiver and couples the drive leader to the cartridge leader.

20. The method of claim 19 further comprising the step of rotating buckler with the buckler motor so that buckler moves the drive leader relative to the receiver and de-couples the drive leader from the cartridge leader.

21. The method of claim 19 including the step of providing an interposer which moves relative to the receiver between a locked position in which the interposer engages a cartridge housing of the cartridge and retains the cartridge within the receiver and an unlocked position which allows the cartridge to be ejected from the receiver, and the step of moving the interposer from the locked position to the unlocked position with the buckler motor.

22. The method of claim 21 further comprising the steps of providing an eject mechanism which moves the cartridge within a portion of the receiver and the step of retaining the interposer in the unlocked position when a cartridge is not positioned within the receiver with the eject mechanism.

23. A tape drive for use with a cartridge, the cartridge including a storage tape having a cartridge leader, the tape drive comprising:
 a receiver which receives the cartridge;
 a drive leader;
 a buckler which selectively retains the drive leader;
 a load ring which rotates relative to the receiver, the load ring being coupled to the buckler so that rotation of the load ring results in rotation of the buckler relative to the receiver; and a buckler motor coupled to the load ring, the buckler motor rotating the load ring and the buckler relative to the receiver so that the buckler couples the drive leader to the cartridge leader.

24. The tape drive of claim 23 wherein the buckler motor rotates the load ring and the buckler relative to the receiver so that the buckler de-couples the drive leader from the cartridge leader.

25. The tape drive of claim 23 including a reel driver which selectively moves between an engaged position in which the reel driver engages a cartridge reel of the cartridge and a disengaged position in which the reel driver does not engage the cartridge reel; wherein the load ring is coupled to the reel driver so that rotation of the load ring results in movement of the reel driver between the engaged position and the disengaged position.

26. A tape drive for use with a cartridge, the cartridge including a storage tape having a cartridge leader, the tape drive comprising:

a drive housing;

a receiver which receives the cartridge;

a drive leader;

a buckler which selectively retains the drive leader; and a flex circuit attached to a front of the drive housing, the flex circuit including a drive status sensor.

27. The tape drive of claim 26 including a buckler motor coupled to the buckler, the buckler motor moving the buckler and the drive leader relative to the receiver so that the buckler couples the drive leader to the cartridge leader.

* * * * *

UNITED STATES PATENT AND TRADEMARK OFFICE
CERTIFICATE OF CORRECTION

PATENT NO. : 6,095,445
DATED : August 1, 2000
INVENTOR(S) : Hentrich, Gregory P.

It is certified that error appears in the above-identified patent and that said Letters Patent is hereby corrected as shown below:

<u>Title page,</u>
Item [75], Inventors, should read -- Hertrich, Gregory P. --.

Signed and Sealed this

Sixteenth Day of May, 2006

JON W. DUDAS
*Director of the United States Patent and Trademark Office*